United States Patent

[11] 3,624,765

[72] Inventor Jean-Marc Laurent Hauth
  Pont-a-Mousson, France
[21] Appl. No. 152
[22] Filed Jan. 2, 1970
[45] Patented Nov. 30, 1971
[73] Assignee Centre de Recherches de Pont-a-Mousson
  Pont-a-Mousson, France
[32] Priority Jan. 27, 1969
[33] France
[31] 6901503

[54] DISC BRAKE
  5 Claims, 3 Drawing Figs.
[52] U.S. Cl. .................................................. 188/72.6,
  188/59, 188/206 R
[51] Int. Cl. ...................................................... F16d55/224,
  B61h 5/00
[50] Field of Search ........................................... 188/72.4,
  72.6, 59, 206 R

[56] References Cited
  UNITED STATES PATENTS
  2,781,106  2/1957  Lucien ........................ 188/72.6 X
  2,862,581  12/1958  Lucien ........................ 188/72.6
  3,109,517  11/1963  Butler et al. ................... 188/59 X Primary Examiner—Duane A. Reger
Attorney—J. Delattre-Seguy ABSTRACT: A disc brake for a vehicle wheel. The brake pad carriers are disposed on each side of the plane of the disc. Two links are respectively pivoted to the carriers and disposed on each side of the plane of the disc. The links are pivoted at their upper ends to a compensating member which is pivoted to the chassis. The carriers are interconnected by a rigid yoke which carries an actuator for shifting the brake pad carriers toward the disc.

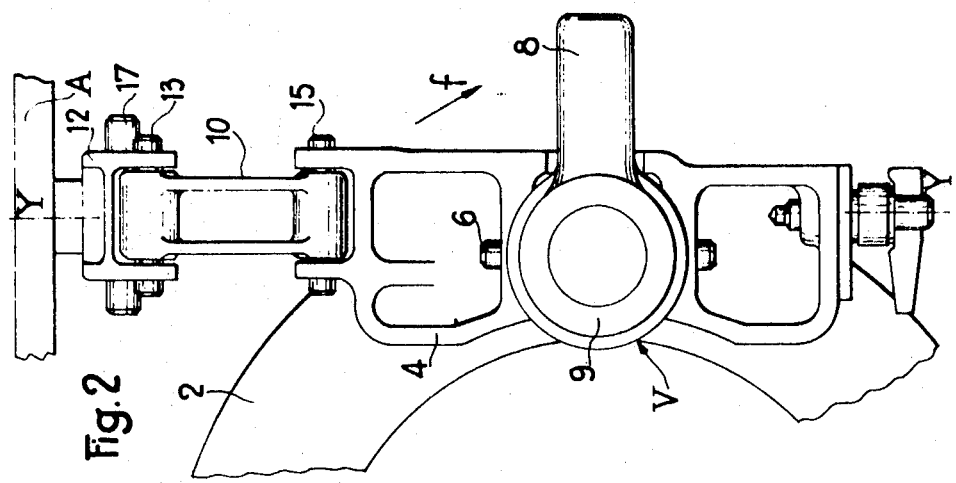
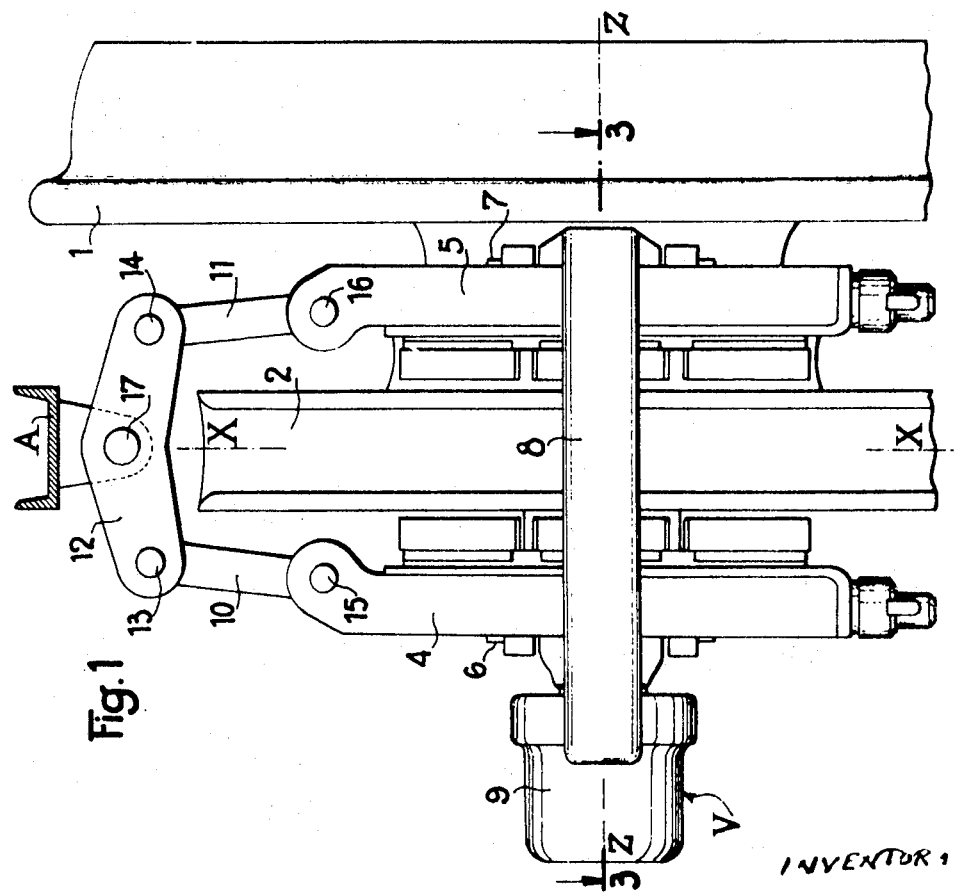

DISC BRAKE

The present invention relates to disc brakes and more particularly to the mounting thereof on the chassis of a railway vehicle.

In current practice relative to vehicles, the brakes are usually integral with the corresponding axle. They are part of the unsuspended part. On the other hand, in some applications and in particular railway braking systems, the brake mechanism cannot be placed on the axle. It is therefore connected to the chassis of the bogie suspended from the axles. Consequently, there is a relative movement between the disc secured to the axle and the braking mechanism secured to the chassis. Under these conditions, a mechanism rigidly secured to the chassis cannot be employed since in some cases this mechanism must withstand the whole of the transverse inertia of the vehicle so as to transmit it to the wheels; this arrangement would result in a deformation of fracture of the disc or of the mechanism.

To avoid these serious drawbacks brake mechanisms have been proposed which are connected to the chassis of the vehicle and comprise a series of pivots, but these are space consuming and heavy. Further, they sometimes allow the friction elements or brake pads freedoms of movement incompatible with the position of the disc in the course of braking. Consequently, in this case there is an irregular bearing of the friction element which adversely affects the effectiveness of the braking and the life of the brake.

Mechanisms are also known in which there are fewer pivots but in which large operational play or clearances are provided. This does not give full satisfaction.

The object of the invention is to provide a disc brake for a vehicle wheel, the brake being of known type having two friction element carriers located on each side of the disc and suspended from the chassis of the vehicle by means of a pair of suspension links mounted on each side of the disc to pivot about pivot axes which are parallel to the disc, the brake being so improved as to avoid all the aforementioned drawbacks.

The invention provides a disc brake wherein the friction element carriers are connected by a rigid yoke which supports an actuator for the friction element carriers and the subassembly thus constituted is suspended from the chassis by said links which are pivoted to a compensation member which is itself pivoted to the chassis, the axes of all the pivots being horizontal and parallel to the disc.

Owing to this combination, the brake control mechanism is rigid enough to allow the friction element carriers only a single degree of freedom, namely the possibility of movement relative to each other in a direction perpendicular to the disc, and the brake faithfully follows the movements of the disc so that the friction elements may remain parallel to the faces of the disc when they are applied thereagainst notwithstanding any movement of the disc. Effective brake application and a regular and uniform wear of the friction elements is thus achieved.

The device according to the invention also has the advantage of being particularly light and of transmitting the braking force to the chassis through the links and the compensation member whose pivots are fitted and not required to undergo bending which shortens their service life.

Further features and advantages of the invention will be apparent from the ensuing description with reference to the accompanying drawings.

In the drawings:

FIG. 1 is an end elevational view of a disc brake according to the invention;

FIG. 2 is a left side elevational view of the brake shown in FIG. 1, and

Figure 3:
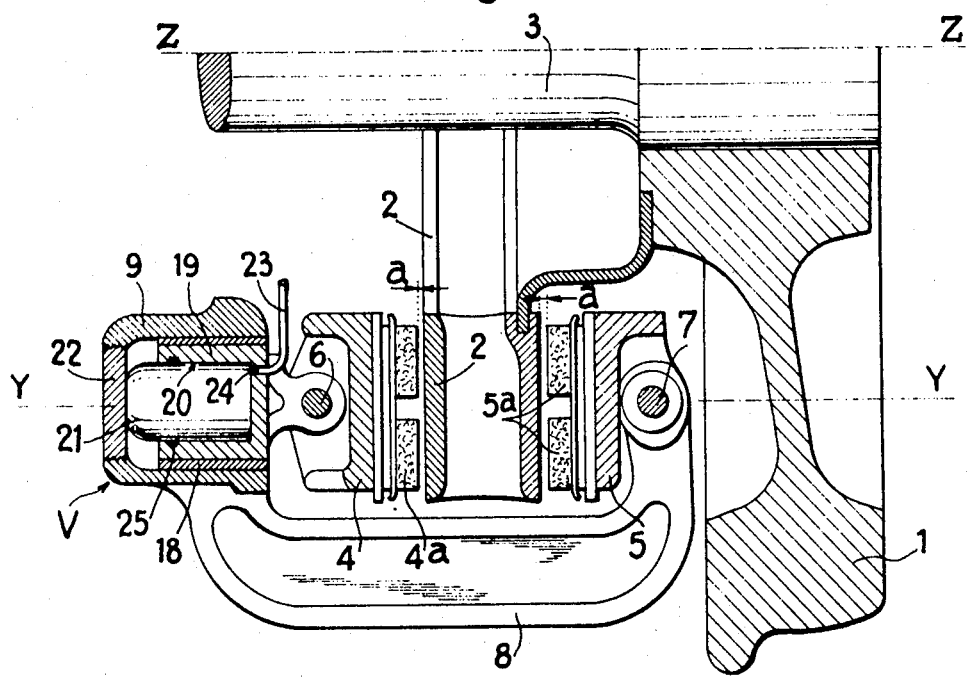
FIG. 3 is horizontal sectional view taken along line 3—3 of FIG. 1.

In the illustrated embodiment, the invention is applied to the braking of the wheel 1 of a railway of one of these bogies girder A one of these bogies has been shown which supports the brake mechanism for the wheel 1 with which is associated the brake disc 2 integral with the axle 3 of the wheel.

Two friction element or brake pad carriers 4 and 5 with their friction elements or pads 4a and 5a are located on each side of the disc 2. These elements and carriers are connected by vertical pins 6 and 7 to a yoke 8 one branch of which comprises the cylinder 9 of an actuator or piston and cylinder device V for applying the brake.

The subassembly comprising the carriers 4 and 5, the yoke 8 and the cylinder 9 of the actuator is suspended by links 10 and 11 from a compensating member 12 pivoted to the girder A of the chassis of the bogie. The pivot pins 13 and 14 interconnecting the member 12 and the links, the pivot pins 15 and 16 interconnecting the links and the carriers 4, 5 and the pivot pin 17 connecting the member 12 to the chassis A are all horizontal and parallel to the median plane X—X of the disc (FIG. 1).

The whole of the assembly constituted by the compensating member 12 and the links 10 and 11 is therefore movable in a direction parallel to the vertical plane Y—Y (FIGS. 2 and 3) which is parallel to the axis Z—Z of the axle of the vehicle.

As can be seen in FIG. 3, the cylinder 9 of the actuator V comprises internally a bearing 18 or bushing in the bore of which is slidable in actuator piston 19. The latter is connected to the friction element carrier 4 by the pin 6. This piston comprises a blind aperture or bore 20 which is slidable along an axial core 21 bearing against an attached end wall 22 of the cylinder 9 by the action of a fluid under pressure supplied through a conduit 23 which communicates with the bore 20 by way of an aperture 24 at the end of the core 21. A sealing ring 25 affords a seal between the piston 9 and the core 21.

A device for taking up wear can be provided in the actuator so as to maintain the friction elements or pads 4a, 5a at a constant distance from the faces of the disc 2 notwithstanding wear.

The brake according to the invention operates in the following manner:

The brake subassembly is suspended from the chassis A by the compensating member 12 and the links 10 and 11. Friction elements or brake pads 4a, 5a are at rest or inoperative at a given distance a (FIG. 3) from the faces or sides of the disc 2.

When braking, the actuating fluid is supplied by way of the pipe 23 and enters the bore 20 of the actuator or piston 19 by way of the aperture 24. The pressure of the actuating fluid is exerted between the core 21 and the inner end face of the piston 19 which starts to move out of the cylinder 9 of the actuator V. The friction element carriers 4 and 5 move towards the disc 2. When the friction elements or pads 4a and 5b rub against the disc 2, the links 10 and 11 and the compensating member 12 are subjected to the tangential braking force which is transmitted to the chassis A. When the disc rotates in the direction f (FIG. 2), the links 10 and 11 are subjected to tensile stress. Conversely, when the disc rotates in the direction opposed to that of arrow f, the links are subjected to compressive stress. The braking device can therefore be employed in both directions of rotation of the wheel.

Owing to the arrangement of the links 10 and 11 and the compensating member 12, a relative movement between the disc 2 and the chassis A can occur with no inconvenience to the continuity of the braking and no increased wear of the friction elements or pads.

This brake device is very flexible in operation and of particular interest in railway vehicle brake systems. It will be observed that the brake applying forces are localized in the yoke 8 whereas the forces resulting from the braking are transmitted to the chassis A through the links 10 and 11 and the compensating member 12. The corresponding parts therefore have a specific function and their stresses are calculated. This makes it possible to lighten the brake assembly and increase its life.

Owing to the fact of mounting the carriers 4 and 5 on the yoke 8 by means of vertical pins 6 and 7 and on the links 10 and 11 by horizontal pins 15 and 16 which are orthogonal to the pins 6 and 7, the assembly comprising the yoke 8 and the carriers 4 and 5 can be rigid and allow the friction elements 4a and 5a only a single degree of freedom, namely in a direction normal to the faces of the disc 2.

Owing to the arrangement of the links and the compensating member, the wear of the friction elements is even, notwithstanding movements of the disc relative to the chassis owing to the flexibility of the assembly.

Owing to the pivoted suspension, on one hand, and the stiffness of the assembly comprising the yoke and friction element carriers on the other, these elements follow perfectly well the movements of the disc and are applied thereagainst in a direction perpendicular thereto. This maintains the parallelism of the friction elements and ensures an effective brake application.

Note furthermore that the actuator V is arranged in a special and advantageous way as revealed by a study of the balance of the forces. When braking, each friction element carrier 4 and 5 acts on the piston 19 in a direction which is not coincident with the axis of the piston. This piston 19 is therefore subjected to bending stress in the bore of the bushing 18 relative to the body 9 of the actuator which might adversely affect the seal between the contacting surfaces of the piston 19 and the bore 20 in the bushing 18. For this reason, the guiding and sealing functions have been separated by providing the core 21 which is movable in the bore 20 of the piston 19. The contacting surfaces of the core 21 and piston 19 are effectively sealed by the ring 25 since the core 21 and the piston 19 are not subjected to bending stress relative to each other.

Having now described my invention what I claim and desire to secure by Letters Patent is:

1. A disc brake for a vehicle wheel connected to a chassis, said brake comprising a rotatable brake disc contained in a first plane and adapted to be secured to said wheel, two brake pad carriers located on each side of said plane, brake pad means carried by said carriers, a compensation member having a middle portion adapted to be pivoted to the chassis and two end portions on each side of said middle portion, two suspension links located on each side of said first plane and having first ends respectively pivotally connected to said end portions of said compensation member and second ends respectively pivotally connected to said brake pad carriers, said links freely extending from said compensation member, all said pivotal connections having pivot axes which are horizontal and parallel to said disc, said compensating member, said links and said brake pad carriers being contained in and relatively pivotable in a second plane which is perpendicular to said first plane and tangential to the direction of rotation of said disc, a rigid yoke, means connecting said brake pad carriers to said yoke and maintaining said brake pad means and the brake pad carriers parallel in said second plane while allowing said carriers to move towards and away from each other and an actuator carried by said yoke for shifting said carriers toward each other and thus applying said pad means against said disc.

2. A disc brake as claimed in claim 1, wherein said actuator comprises a carrier shifting member, a pivot pin pivotally connects one of said brake pad carriers to an end portion of said yoke and another pivot pin pivotally connects the other of said brake pad carriers to said shifting member, said pins being parallel to said first plane, said pivotal connections between said links and said compensation member having pivot axes orthogonal to said pins.

3. A disc brake for a vehicle wheel having a brake disc contained in a plane and adapted to be secured to said wheel, two brake pad carriers located on each side of said plane, a rigid yoke, means connecting said brake pad carriers to said yoke, an actuator carried by said yoke for shifting said brake pad carriers toward said disc, a compensation member having a middle portion adapted to be pivoted to a chassis to which said wheel is connected and two end portions on each side of said middle portion, and two suspension links located on each side of said plane and having first ends respectively pivotally connected to said end portions of said compensation member and second ends respectively pivotally connected to said brake pad carriers, all said pivotal connections having pivot axes which are horizontal and parallel to said disc, said actuator comprising means defining a guide cylinder integral with said yoke, an end wall integral with said yoke, a hollow actuator piston slidable in said cylinder, a core movable in said cylinder and in abutting relation to said wall, said piston being slidably mounted on said core and defining with said core a chamber, sealing means interposed between said core and said hollow piston for sealing said chamber, and a fluid supply conduit communicating with said chamber for supplying fluid under pressure to said chamber.

4. A structure comprising in combination a railway vehicle bogie having a chassis, a wheel connected to said chassis and a disc brake for the wheel, said disc brake comprising a brake disc secured to said wheel and contained in a first plane, two brake pad carriers located on each side of said plane, brake pad means carried by said carriers, a compensation member having a middle portion pivoted to said chassis in said first plane and two end portions on each side of said middle portion, two suspension links located on each side of said first plane and having first ends respectively pivotally connected to said end portions of said compensation member and second ends respectively pivotally connected to said brake pad carriers, said links freely downwardly extending from said compensation member, all said pivotal connections having pivot axes which are substantially horizontal and substantially parallel to said disc, said compensating member, said links and said brake pad carriers being contained in and relatively pivotable in a vertical second plane which is perpendicular to said first plane and tangential to the direction rotation of said disc, a rigid yoke, means connecting said brake pad carriers to said yoke and maintaining said brake pad means and the brake pad carriers parallel in said second plane while allowing said carriers to move towards and away from each other, and an actuator carried by said yoke for shifting said carriers towards each other and thus applying said pad means against said disc.

5. A disc brake for a vehicle wheel connected to a chassis, said brake comprising a rotatable brake disc contained in a first plane and adapted to be secured to said wheel, two brake pad carriers located on each side of said plane, brake pad means carried by said carriers, a compensation member having a middle portion adapted to be pivoted to the chassis and two end portions on each side of said middle portion, two suspension links located on each side of said first plane and having first ends respectively pivotally connected to said end portions of said compensation member and second ends respectively pivotally connected to said brake pad carriers, said links freely extending from said compensation member, all said pivotal connections having pivot axes which are horizontal and parallel to said disc, said compensating member, said links and said brake pad carriers being contained in and relatively pivotable in a second plane which is perpendicular to said first plane and tangential to the direction of rotation of said disc, a rigid yoke, means connecting said brake pad carriers to said yoke and maintaining said brake pad means and the brake pad carriers parallel in said second plane while allowing said carriers to move towards and away from each other and an actuator carried by said yoke for shifting said carriers toward each other and thus applying said pad means against said disc, said actuator comprising means defining a guide cylinder fixed relative to said yoke, means defining an end wall fixed relative to said yoke, a hollow actuator piston slidable in said cylinder and connected to one of said brake pad carriers, a core movable in and guided by said cylinder and in abutting relation to said end wall, said piston being movable along said core and defining with said core a chamber, sealing means interposed between said core and said hollow piston for sealing said chamber and a fluid supply conduit communicating with said chamber for supplying fluid under pressure to said chamber for urging said one of said brake pad carriers toward the other brake pad carriers and applying the brake.